United States Patent [19]

Coddington

[11] Patent Number: 4,838,794
[45] Date of Patent: Jun. 13, 1989

[54] METRIC BLOCK TOY

[76] Inventor: Lyman Coddington, 2500 "Q" St., NW., Washington, D.C. 20007

[21] Appl. No.: 207,232

[22] Filed: Jun. 16, 1988

[51] Int. Cl.⁴ .............................................. G09B 1/34
[52] U.S. Cl. .................................... 434/187; 434/195; 434/207; 434/208; 434/403
[58] Field of Search ............... 434/187, 195, 207, 208, 434/211, 403

[56] References Cited
U.S. PATENT DOCUMENTS
2,635,355  4/1953  Thompson et al. ................. 434/195

OTHER PUBLICATIONS

Knott Apparatus Co., pp. 29, 30, 10-25 Catalog 21, 1917.
Welch Scientific Co., p. 16, Item 0132, 1965.

Primary Examiner—William H. Grieb
Attorney, Agent, or Firm—Charles E. Temko

[57] ABSTRACT

A metric block toy comprising ten blocks of varying colors, each block being a one tenth of a meter cube, and having indicia designating ten centimeter increments along one edge of each block, together with other legends designating the length of the edge invarying metric terms. The blocks, when placed in aligned relation, indicate the total length of one meter.

2 Claims, 1 Drawing Sheet

METRIC BLOCK TOY

BACKGROUND OF THE INVENTION

This invention relates generally to the field of devices for the teaching of the metric system, and more particularly to an improved toy suitable for use by children of relatively tender years whereby they may acquire a degree of familiarity with the metric system, as a part of their preschool exposure. Devices of this general type are known in the art, and the invention lies in specific constructional details which enable the device to be used by children who are just beginning to read.

The prior art includes U.S. Pat. No. 176,735 granted to W. F. Bradbury May 2, 1876. It comprises a hollow metric box adapted to be filled by a solid metric cube, with a separable one centimeter cube located in one corner thereof.

The McCourt U.S. Pat. No. 480,119 granted Aug. 2, 1892 features a metric cube, a one-tenth part of which is formed as a hinged construction resembling a carpenter's rule.

The Nogues U.S. Pat. No. 4,322,567 granted June 1, 1982 discloses a somewhat similar, if more complicated construction which is used as a teaching aid for arithmetic, metric and analytical geometry as well as elementary algebra. It is formed by a cubic block array comprising a plurality of different sized blocks arranged in rows and columns. The cubic block array has a base array of ten-by-ten blocks commencing with a one centimeter block and progressing in x and y rows with increasing length blocks and overlying arrays of the same pattern but progressively increasing in height.

The devices described in the above patents are not without utility, but have serious limitations in the form of complexity of manufacture and difficulty from the standpoint of manipulation by children of preschool age. Further, because of the large number of parts in such devices, the educational content and concept, contemplated by the use thereof is not readily imparted to such children.

SUMMARY OF THE INVENTION

Briefly stated, the invention contemplates the provision of a ten block set of cubic molded blocks each of ten centimeter dimension, each having a distinct color. A side of each block along an edge thereof has ten centimeter designation, together with a legend indicating the total length about an edge in alternate forms, i.e. ten centimeters, one hundred millimeters, etc. Other side surfaces have legends relative to volume, i.e. one liter, and mass, i.e. one hectogram, ten decagrams, and one hundred grams. The blocks may be used for building simple structures, and may be placed in aligned relation to give an indication of total length encompassed by the term one meter.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSD EMBODIMENT

Figure 1:
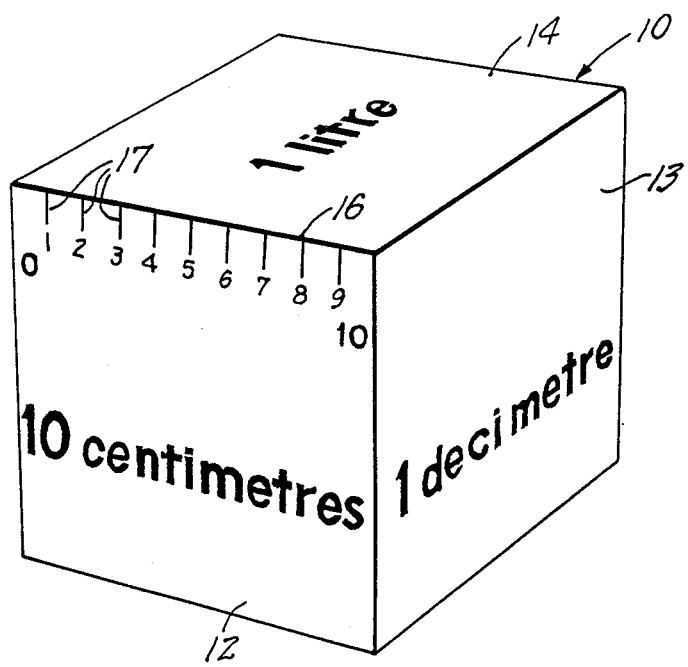
FIG. 1 is an isometric view of a single block comprising a part of a set of blocks embodying the invention.

In accordance with the invention, the embodiment, generally indicated by reference character 10, comprises ten individual cubic blocks each having first, second, and third planar surfaces 12, 13 and 14 respectively. A first surface 12 includes a marginal edge 16 having equally spaced gradations 17 designating ten centimeter increments.

The second surface 13 bears a decimeter legend 20, while the third surface 14 bears a volume designation 15 indicating one liter.

Figure 2:
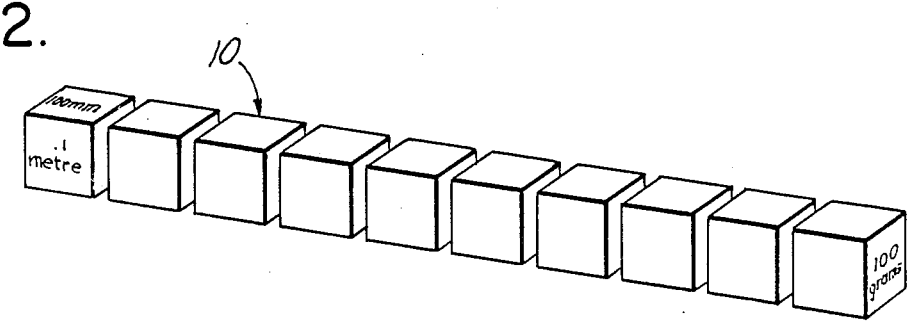
FIG. 2 is a view in perspective of a complete ten block system embodying the invention.
Figure 3:
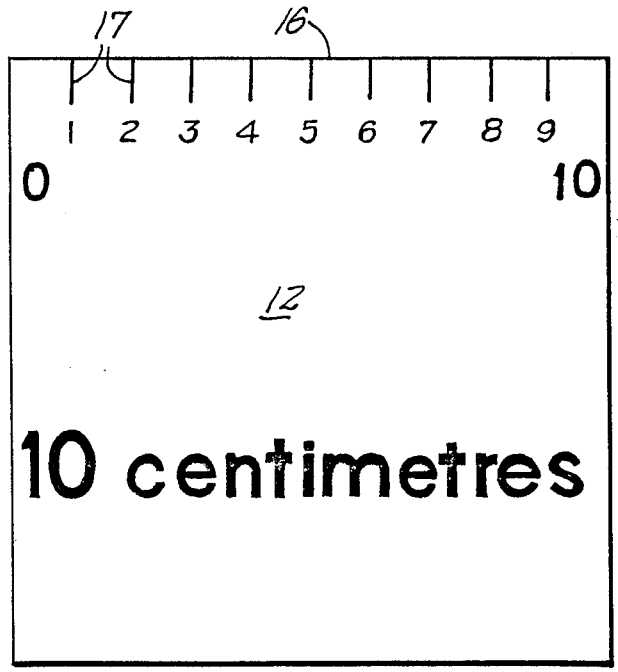
FIG. 3 is a view in elevation showing a typical surface of a block.

Referring to FIG. 2, the remaining three surfaces of each block indicated by references 24, 25 and 26 contain legends relative to the length and mass of an individual block, i.e. 100 millimeters and 0.1 meter. Mass is expressed in terms of 100 grams The blocks may be assembled, as indicated in FIG. 2, in aligned axial relation to impart an idea of the length of one meter, and to increase play value, the blocks are preferably molded using synthetic resinous materials of the ten basic colors recognized by the International Commission on Illumination.

In order to build simple structures, a common activity with preschool children, the user must handle each of the blocks individually. This induces the child to appreciate the concept of the various terms indicated on the exposed surfaces of the blocks. As an aid to learning the concept of weight, the blocks will be formed hollow enough to match the weight indicated on the blocks.

I wish it to be understood that I do not consider the invention to be limited to the precise details of structure shown and set forth in this specification, for obvious modifications will occur to those skilled in the art to which the invention pertains.

I claim:

1. A set of toy blocks for teaching the metric system comprising: ten cubic blocks each of the dimension ten centimeters square, and having six square exposed surfaces; one of said exposed surfaces having a rectangular edge, said edge having nine equally spaced gradations thereon designating a distance of one centimeter, said surface having a legend indicating the total length of said edge; a second of said exposed surfaces having a legend indicating the volume of said block in terms of metric measurement; a third of said exposed surfaces bearing a legend indicating the mass of said block in terms of metric measurement; three similarly exposed gradated surfaces having legends corresponding to 0.1 meter, 100 millimeters, and 1 decimeter respectively.

2. A set of blocks in accordance with claim 1, further characterized in said blocks being molded from synthetic resinous materials of different spectral colors.

* * * * *